Dec. 10, 1929.          A. W. BRUCE          1,739,123
TRUCK FOR RAILROAD VEHICLES
Filed Sept. 13, 1927          2 Sheets-Sheet 1
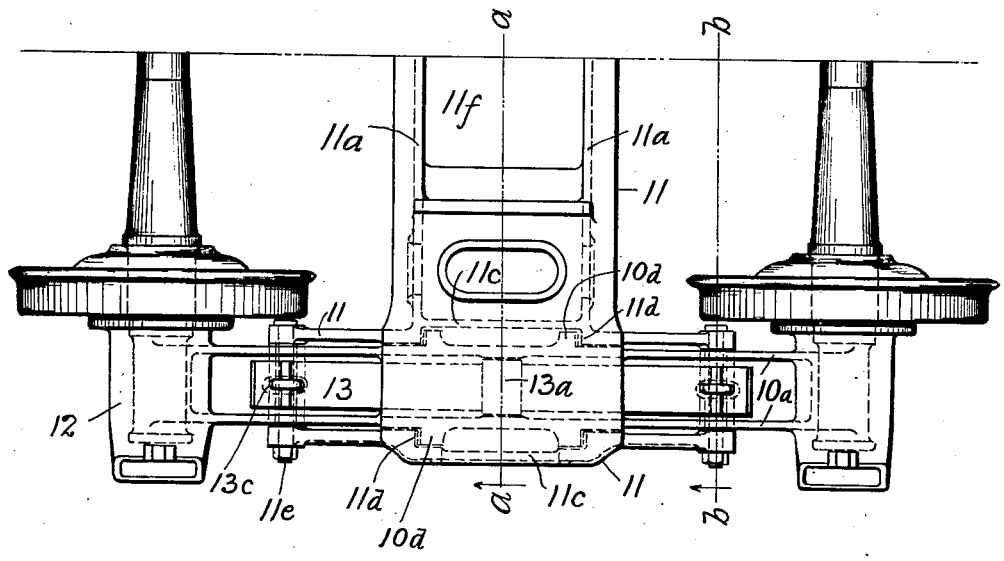
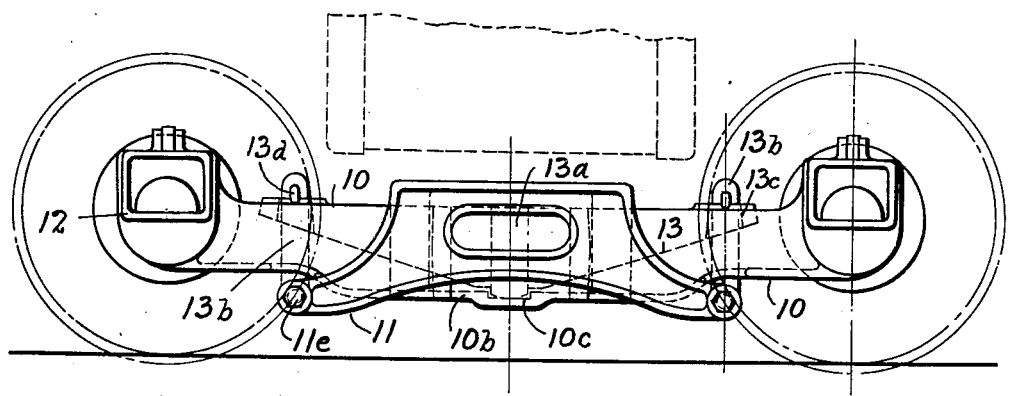

Dec. 10, 1929.  A. W. BRUCE  1,739,123
TRUCK FOR RAILROAD VEHICLES
Filed Sept. 13, 1927  2 Sheets-Sheet 2
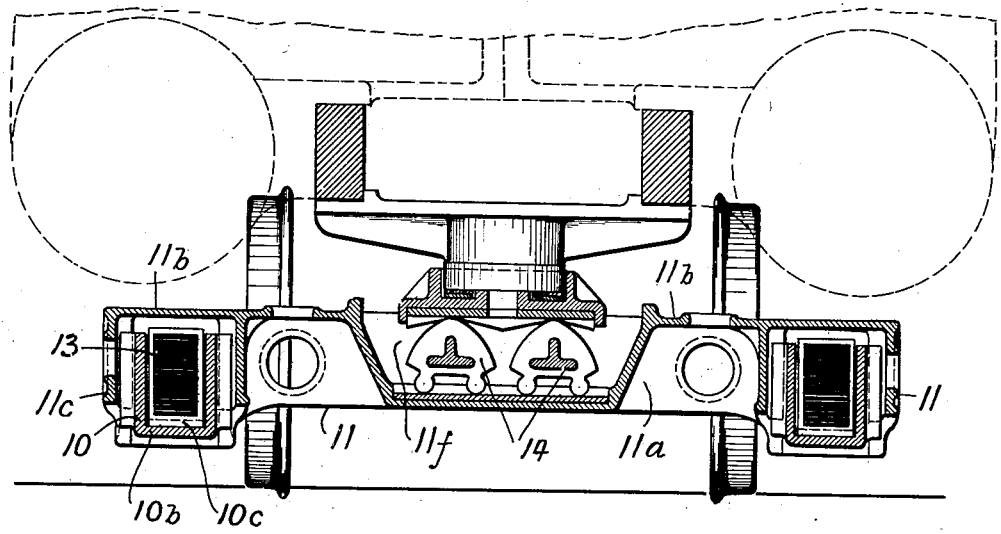
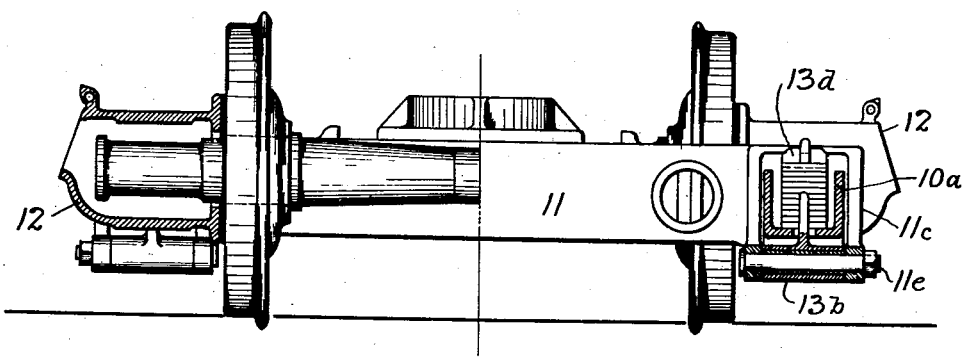
WITNESSES
INVENTOR Patented Dec. 10, 1929

1,739,123

UNITED STATES PATENT OFFICE

ALFRED W. BRUCE, OF NEW YORK, N. Y.

TRUCK FOR RAILROAD VEHICLES

Application filed September 13, 1927. Serial No. 219,252.

This invention relates to trucks for railroad vehicles, and its object is to provide a truck of such character, which can be economically manufactured; which is of durable and compact construction; which embodies a minimum number of parts; which is free of the usual bolted or riveted connections; and which provides a simple and efficient means for equalizing the imposed weight between the axles.

The improvement claimed is hereinafter fully set forth.

In the accompanying drawings: Figure 1 is a side view, in elevation, of a truck embodying the invention; Fig. 2, a top plan view of one half of the truck; Fig. 3, a vertical transverse section, through the same, taken on the line, $a\ a$ of Fig. 2; and, Fig. 4, a front view of the same, one half in vertical transverse section taken on the line $b\ b$, of Fig. 2, and one half in elevation, with the journal box shown in vertical transverse section.

In the practice of the invention, referring descriptively to the specific embodiment thereof which is herein exemplified, as applied in a four wheel leading truck, of the outside bearing type, the truck frame comprises three major parts, viz, two side frame members, 10, and a bolster, 11, each formed as an integral, or one piece casting.

Each side frame member is integrally formed, at each end, with a journal box, 12, and comprises two spaced, longitudinally extending, vertical walls, $10^a$, which connect the journal boxes. A bottom wall, $10^b$, connects the two side walls for a portion of their length, and serves as a seat for the plate spring, 13. A recess, $10^c$, is provided in the bottom wall, for the reception of the spring band $13^a$. It is to be noted that the side walls and the bottom wall form a pocket in which the spring is substantially enclosed.

The bolster, 11, is formed with two spaced vertical side walls, $11^a$, and at each end with a top wall, $11^b$, and two spaced transverse vertical walls, $11^c$. Each pair of transverse walls is adapted to straddle one of the side frames, by which means, the side frame members and the bolster are locked together, with the capacity of relative vertical movement. Each of the transverse walls of the bolster is provided with a recess, $11^d$, adapted to receive the lugs, $10^d$, formed on the longitudinal walls of the side frames, by which means the bolster is held against longitudinal displacement, relatively to the side frames.

In order to provide for equalizing the weight imposed on the truck, between the two axles thereof, each of the transverse walls of the bolster is formed, at each end, with an extension or arm, and the pair of arms, at each side of the bolster, is connected by a bolt, $11^e$, which passes through the lower end of a spring hanger, $13^b$. The upper end of each hanger passes through a slot, $13^c$, in the end of the spring, and is locked to the spring by a gib, $13^d$. As each spring is fulcrumed centrally on one of the side frames, each side frame will serve as a lever to equally distribute the weight imposed on the bolster, between the two axles of the truck.

An additional feature of the invention, is the provision, in the bolster, of a central pocket, $11^f$, for the reception of a suitable lateral motion device. One type of such device is shown in Fig. 3 of the drawings, and embodies the well known three joint rockers 14.

It is believed to be broadly novel to provide a truck for railroad vehicles, comprising a bolster and two side frames, each formed as an integral casting, the respective members being locked together, with the capacity of relatively vertical movement, without the use of bolting or riveting, and the side frames being adapted to serve as equalizing levers to efficiently distribute the weight imposed on the bolster, between the axles.

The invention claimed as new and desired to be secured by Letters Patent, is:

1. In a truck for railroad vehicles, the combination of two side frame members, each formed as an integral casting, and comprising a journal box at each end; and a bolster, formed as an integral casting and embodying, at each end, means by which it is locked to the adjacent side frame member, to permit only limited relative vertical movement, comprising end top portions above and normally spaced from the side frame members, and members below and normally spaced from the side frame members.

2. In a truck for railroad vehicles, the combination of two side frame members, each formed with a fulcrum seat for a longitudinally disposed plate spring; a plate spring fulcrumed on said seat; a bolster embodying, at each end, means by which it is locked to the adjacent side frame, with the capacity of relatively vertical movement; and means for connecting each end of the bolster to an end of the adjacent spring.

3. In a truck for railroad vehicles, the combination of two side frame members, each formed as an integral casting, and embodying a pocket and a fulcrum seat for a longitudinally disposed plate spring; a plate spring fitted in said pocket and fulcrumed on said seat; a bolster embodying, at each end, means by which it is locked to the adjacent side frame, with the capacity of relatively vertical movement; and means for connecting each end of the bolster to an end of the adjacent spring.

4. In a truck for railroad vehicles, the combination of two side frame members, each formed as an integral casting, and embodying a journal box at each end, and a pocket and a fulcrum seat for a longitudinally disposed plate spring disposed intermediate the journal boxes; a plate spring fitted in said pocket, and fulcrumed on said seat; a bolster, embodying, at each end, means by which it is locked to the adjacent side frame, with the capacity of relatively vertical movement; and means for connecting each end of the bolster to an end of the adjacent spring.

5. In a truck for railroad vehicles, the combination of two side frame members, each formed as an integral casting, and embodying a journal box at each end, and a pocket and a fulcrum seat for a longitudinally disposed spring; a plate spring fitted in said pocket and fulcrumed on said seat; a bolster formed as an integral casting, and embodying at each end, means by which it is locked to the adjacent side frame, with the capacity of relatively vertical movement; and means for connecting each end of the bolster to an end of the adjacent spring.

6. In a truck for railroad vehicles, the combination of two side frame members, each formed as an integral casting, and embodying a journal box at each end, and a pocket and a fulcrum seat for a longitudinally disposed spring seat; a plate spring, fitted in said pocket, and fulcrumed on said seat; a bolster, formed as an integral casting, and embodying, at each end, means by which it is locked to the adjacent side frame member, with the capacity of relatively vertical movement, and a centrally disposed pocket for a lateral motion device; and means for connecting each end of the bolster to an end of the adjacent spring.

7. In a truck for railroad vehicles, the combination of two side frame members, each formed as an integral casting, and embodying a journal box at each end, two spaced vertical longitudinal walls, connecting the journal boxes, and a transverse wall, connecting the side walls below their tops; a plate spring, fitted between the side walls and fulcrumed, intermediate its length, on the transverse wall; a bolster, formed as an integral casting, and embodying two spaced side walls, a top wall at each end, and two spaced, transverse walls at each end, connected by one of the top walls, and forming therewith a socket adapted to straddle an adjacent side frame to lock the bolster thereto, with the capacity of relatively vertical movement, each of the transverse walls being extended beyond the side walls to form arms; a member, connecting the ends of each pair of arms; and spring hangers, each connected at its lower end to one of the members, and at its upper end to one end of the adjacent spring.

8. In a four wheel truck of the outside bearing type for railroad vehicles, the combination of a pair of wheeled axles, having journals disposed outside of the wheels; a pair of side frame members, each formed as an integral casting, and embodying a journal box at each end, for one of the journals and a pocket for a longitudinally disposed plate spring; a plate spring fitted in said pocket; a bolster, formed as an integral casting, and embodying two spaced, longitudinal vertical side walls, and a socket at each end, extending transversely beyond the side walls, adapted to straddle an adjacent side frame member, and lock the bolster thereto, with the capacity of relatively vertical movement; a bolt passing through each end of the socket; and a spring hanger, connected to each bolt and to one end of an adjacent spring.

9. In a truck for railroad vehicles, a pair of wheels carrying axles; a longitudinally disposed equalizer member between the axles for transmitting load thereto; and a longitudinally disposed plate spring, for carrying load at each end thereof, supported between its ends upon said equalizer member at a point between said axles.

10. In a truck for railroad vehicles, a pair of wheel carrying axles; a side member supported by said axles; and a longitudinally disposed plate spring, for carrying load at each end thereof, supported between its ends, upon said side member at a point between said axles.

ALFRED W. BRUCE.